Patented June 22, 1948

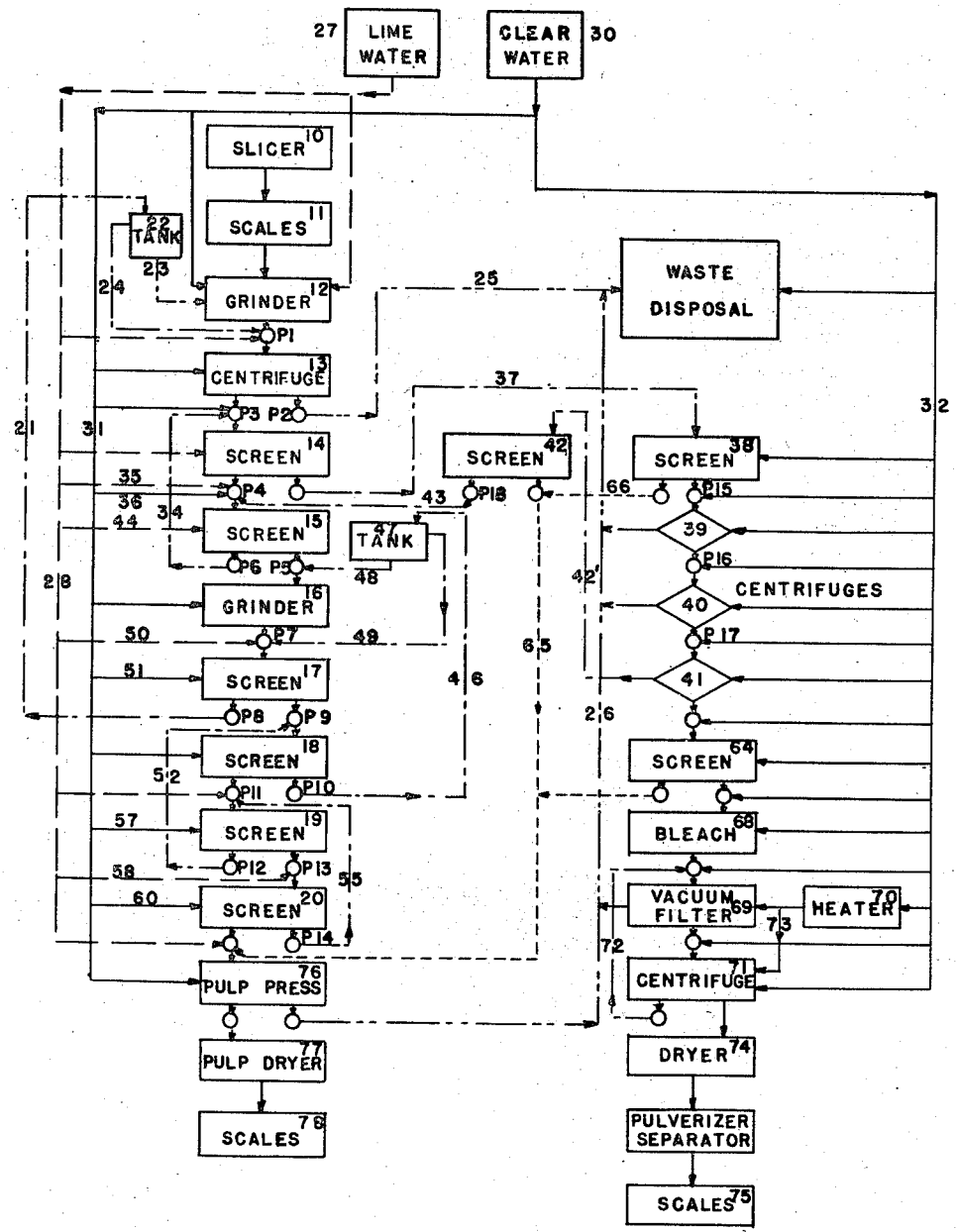

2,443,897

UNITED STATES PATENT OFFICE 2,443,897

PROCESS FOR THE PRODUCTION OF SWEET-POTATO STARCH

Gregory M. Dexter, Scarsdale, N. Y., and Francis H. Thurber, Washington, D. C.; said Thurber assignor to the United States of America as represented by the Secretary of Agriculture, and said Dexter assignor to United States Sugar Corporation, Clewiston, Fla., a corporation of Delaware Application March 23, 1944, Serial No. 527,840

9 Claims. (Cl. 127—66)

This invention relates to the production of starch, more particularly to an efficient and continuous method for extracting quickly the starch from sweet potatoes (Ipomoea batatas). It is not limited, however, to the production of any one starch, but may be applicable in part or in whole to all starches. It has been found to be particularly applicable to the production of sweet potato starch.

The specific objects of the invention and their preferred manner of attainment will be set forth hereinafter in connection with a detailed description of the process and are not, therefore, detailed in a preliminary statement of objects.

This invention resides substantially in the steps and combination of steps comprising the subject matter of this disclosure.

In the accompanying drawings the single figure is a schematic and diagrammatic layout of the apparatus, by means of which the process of this invention may be practiced and for the detailed disclosure of which the layout has been included.

The so-called root starches, and particularly sweet potato starch, have certain physical and chemical properties which render them very useful in many industries where they may be used more advantageously than starches from other sources. There has not, however, been developed in this country to any extent a sweet potato starch industry. Efforts to develop a highly mechanized process with low labor costs for the efficient extraction of an exceptional quality of starch to compete on a price basis with other starches have been made in order that a large sweet potato starch industry may be possible. The methods developed as a result of those efforts are disclosed in this specification.

In processes now used industrially, the starch is often in process for as much as 72 hours and is exposed to the air so that it is subjected to the action of bacteria, yeast, fungii, enzymes, molds and other micro-organisms for this long period of time. Their action results in a degradation or modification of the starch, resulting in a lowered viscosity. In some starch processes, chemicals are added to inhibit the action of micro- organisms. In such cases, the chemicals themselves exert a modifying action upon the starch.

Starch as it occurs in sweet potatoes or other carbohydrate sources has many desirable properties for industrial purposes. Note, for example, the sizing of fine cotton warps where unmodified high viscosity starches form a protective coating around the threads and prevent breakage of the threads in the weaving process. Another example is the use of high viscosity starch in making vegetable glues. Such starch when treated with caustic soda makes a highly adhesive glue with the use of less caustic soda than is required for low-grade starches. An excess of alkali is undesirable because of its effect on the surface of the wood or other material to which the adhesive is applied.

These properties of unmodified and modified starch are commonly denoted by viscosity measurements. The extent of modification is indicated by the lowering of the viscosity of the paste made from the starch.

The process described below is unique in that the processing time is reduced to not over four hours, thereby making possible the recovery of starch from sweet potatoes and other root crops in a relatively unchanged condition. The inventors are of the opinion that there is no other industrial process for the extraction and recovery of starch in which the starch is recovered in a practically unchanged condition as is indicated by its extremely high viscosity.

Sweet potatoes are of a nature which makes them difficult to handle mechanically. Also many difficulties have to be overcome in extracting the starch from them. In a general sense, sweet potatoes consist mainly of fibre, starch, sugars, gums and other soluble and insoluble constituents including coloring matter that are difficult to separate. The relatively high percentage of carbohydrates other than starch, gum, and coloring matter present in sweet potatoes, plus the firmness with which the starch is locked in the fibrous structure, makes it extremely difficult to recover a sufficiently high percentage of the starch to make a process of recovery commercially feasible.

Relatively high percentages of the gums, coloring matter, and other solubles and insolubles carry along with the starch in the usual manufacturing processes. Moreover, particularly in warm weather, the carbohydrates and other solubles ferment easily and should be separated quickly from the starch in order that a good quality starch may be produced and loss of starch avoided. Bacteria, yeast, fungii, enzymes and molds create end products that are difficult to separate from the starch and make desirable a fast method for the recovery of the starch that will reduce the time available for their growth. The presence of gums, coloring matter, and other solubles and insolubles complicates greatly the usual processes of extracting the starch because of their interference with the efficient operation of the separating equipment due to clogging and sticking thereto. Subsequent fermentation increases the clogging and sticking action.

In accordance with this invention, these major as well as minor difficulties have been overcome by the process of this invention partly by the elimination of starch tables and settling tanks commonly employed in the corn starch, cassava starch, white potato starch, and other starch industries. It is very significant that this result has been obtained in a continuous process in which the sweet potatoes move continuously and rapidly from their point of entry into the process until the completion of the processing at the stage of production of a pure, white sweet potato starch and a pulp residue highly suitable for cattle feed.

With reference to the starch tables and settling tanks, those skilled in the art are fully aware of the expense of properly constructing and maintaining them in a process of this type, of the labor of operating them, and of the excessive capital and overhead costs due to the large amount of space which they occupy in a plant of any sizable capacity. Heretofore, as far as is known, the recovery of sweet potato starch from the starch milk or potato slurry has not been accomplished without the use of starch tables, and/or settling tanks. Furthermore, a fast, continuous, low-cost, commercial process for this purpose has not been developed.

In accordance with the process of this invention, all of the important difficulties and inconveniences heretofore encountered in the prior efforts to extract starch from sweet potatoes have been successfully eliminated in a process which is rapid and continuous.

With due reference to the accompanying drawings, a detailed description of the process will now be set forth.

The sweet potatoes, either from the field or from suitable storage facilities, are preferably first soaked for a short time and washed to remove the dirt adhering to the surfaces thereof. In some cases it may be desirable, but it is not necessary in accordance with this process, to skin the potatoes.

After washing, the potatoes pass directly to a cossette or slicing machine 10 which rapidly cuts them into thin slices. The use of a machine of this type at the outset of the process is very desirable in order to prepare the potatoes for subsequent treatment, to permit accurate weighing continuously on a conveyor, and to even out the load upon the grinding machines to which they are fed. The potato slices are then fed, in any suitable manner such as by an endless belt, to a continuously weighing scale 11, from which they are delivered into a grinding machine 12, preferably of the attrition type.

Heretofore in the efforts to develop a practical process, potatoes have been fed directly to hammer mills or saw tooth rasp mills which pulp or grind them. This method imposes a constantly varying load upon the hammer mill particularly with sweet potatoes which vary greatly in size. The probably more important objection to hammer and rasp mills is that they do not shred the potato fibre as extensively as attrition mills so as to release or expose the entrained starch for its efficient recovery. The use of cossette or slicing machines and attrition mills, however, is not essential to the success of this process, although probably desirable.

The grinding machine or attrition mill of this invention may, for example, consist of a pair of parallel plates having corrugated or roughened opposed surfaces and mounted so that one rotates and so that the spacing therebetween can be varied as required. The corrugations on the plates may also be changed as required. In grinding the potatoes by this method the potato fibres and pulp are shredded and disintegrated so as to render the removal of the starch easier.

During grinding, in accordance with this invention, the ground mass is diluted by means of process water consisting of starch milk recovered from a later stage of the process, that is from screen 17, by means of a pump P8 and delivered through a line 21 to a suitable overflow container or tank 22. The process water is delivered from the container 22 through a pipe 23 into the grinder 12. This process water is starch milk from the countercurrent screening system following grinder 16. This overflow tank 22 permits the delivery of the optimum amount of process water essential to give the right consistency of the potato slices for the proper operation of the attrition grinder 12. The excess is added by pipe 24 to the slurry from grinder 12 and passed to the continuous solid bowl centrifuge 13 by way of pump P1. In grinder 12 the potato slices and fibre are disintegrated so that the starch and solubles may be separated from the pulp at a later stage in the process. Practical results can be secured by adding starch milk either during or after grinding, but the preferred procedure is to add it both during and after grinding.

The slurry from grinder 12 is delivered by the pump P1 to a continuous solid bowl centrifugal separator 13. Usually lime water is added to the slurry through pipe 28 from tank 27 to insure an alkaline reaction of the potato slurry in order to solidify pectins and substances of similar nature which remain with the pulp and to harden its fibrous content. Such solidification permits the easier washing out of the solubles from the slurry in the continuous solid bowl centrifugal separator 13. It will be helpful to note that the principal addition of lime water for the process is made to the system through the connection 58 to pump P13 ahead of screen 20.

This process is not limited to the use of calcium hydroxide for the purpose of hardening the fibre and improving screening and other physical and chemical phases of the manufacturing process. Other chemicals such as sulphur dioxide and alkaline sulphites may be used.

A high percentage of the solubles is removed from the potato slurry in the continuous solid bowl centrifugal separator 13. The starch and pulp remaining in the centrifugal are then washed with clear water from tank 30 through pipe line 31 in order to remove more of the solubles. The general effect of the centrifugal operation is to substitute fresh water for the potato juices and solubles therein. The solubles removed are discharged by pump P2 through pipe 25 to waste disposal or to further processing for the recovery of useful constituents thereof, with both of which we are not here concerned. The separated solids of starch and pulp from the centrifugal 13 are discharged to a tank and pump P3, where they are brought to proper consistency for screening to remove pulp, by adding starch milk from screen 15 by pump P6 and pipe line 34 from the first countercurrent screening system consisting of screens 14 and 15.

A commercial example of a centrifuge of this type 13, suitable for this purpose, is known as the Bird classifier and is made by the Bird Machine Co.

In most cases in the drawing the circles indicate diagrammatically a tank and/or a pump. The material in each case flows by gravity into the tank and from there it is pumped (in some cases in actual factory operations by gravity flow) to the succeeding station or stage of the process. The elements comprising a tank and pump have been shown in this simplified manner in the drawings to simplify the drawings as much as possible.

The starch-milk diluted mixture of starch and pulp is carried by the pump P3 onto the screen cloth of a screen 14. Further additions of fresh water and lime water, as required, may be made to the mixture on the screen through pipe lines as indicated in the drawing. The partially starch-free pulp is discharged from screen 14 to a pump P4 which delivers it to screen 15 where further addition of lime water, as required, may be made if necessary through line 44. As previously mentioned, the starch milk recovered from screen 15 is passed to pump P6 through pipe line 34 to the intake of pump P3.

Throughout the process as described, the potato slurry is being continuously mixed with the overflow of starch milk from the starch purification system (centrifuge 41) made alkaline by the addition of lime and fresh water in an emergency if necessary, so that a high percentage of the starch from the potato slurry is separated from it and passes through screen 14 as starch milk. This starch milk is delivered through pipe line 37 onto screen 38 which will be referred to later.

The further starch-depleted pulp from screen 15 is then passed by tank and pump P5 to another attrition grinder 16 to which fresh water, as required, may be added in an emergency from line 31. Other types of grinders could be used but it is preferred to use an attrition mill. There is added to the pulp in tank P5 starch milk from the overflow tank 47 through the pipe line 48. The starch milk in the tank 47 is collected from tank and pump P10 from the screen 18 through the pipeline 46 connected to the discharge of pump P10. Thus the pulp is diluted again for regrinding by starch milk from the second countercurrent screening system consisting of screens 17, 18, 19 and 20.

In the grinder 16 the pulp is further disintegrated and shredded to ensure the release of as much as possible of its starch content. The ground mass is delivered by pump P7 together with overflow of process water, from tank 47 through pipe line 49, onto screen 17 where it may be further diluted in an emergency if necessary by the addition of fresh water from line 51. As previously mentioned, the starch milk recovered by the screen 17 is delivered by tank and pump P8 through the pipe line 21 back to the overflow tank 22 for reintroduction into the process and recovery at pipeline 37.

The screens used have a high rate of vibration due to operating them at speeds of the order of 1800 revolutions per minute and also have an oscillating motion that acts to rub and shake the starch out of the fibre. Note that some of the screens used are fitted with finer mesh screen cloth than others, depending on the location of the screens in the process. As a feature facilitating commercial operations, the screens are preferably built so that the screen cloths with supporting frames may be easily removed for steaming, washing, and replacement as required.

The ground pulp is delivered from screen 17 by tank and pump P9 to screen 18 and is diluted in tank P9 by the addition thereto of starch milk as recovered from screen 19 and delivered by tank and pump P12 through pipe line 52. As previously described, the starch milk separated by the screen 18 is delivered by pump P10 through connected pipe line 46 to overflow tank 47.

The starch-depleted pulp from screen 18 is passed by tank and pump P11 to screen 19 and has introduced into it in the tank P11 starch milk recovered from the screen 20 and delivered by tank and pump P14 through pipeline 55 and if necessary lime water from pipe 28. The mixture may be further diluted in an emergency if necessary on screen 19 by the addition of fresh water through pipe line 57. The starch-depleted pulp from screen 19 is delivered by tank and pump P13 to another screen 20. It is diluted in tank P13 by the addition of lime water through pipeline 58. It is at this point that the major addition of lime water to the process is made.

The starch-depleted pulp on screen 20 may be further diluted in an emergency if necessary with fresh water through pipeline 60. The process water containing starch, or starch milk, as separated by screen 20 is delivered by tank and pump P14 through the pipe line 55 back to the tank and pump P11. The pulp from which the starch has been thoroughly extracted is delivered from screen 20 by conveyor or pipeline to pulp press 76. Excess water in the dilute pulp may be removed in a water screen reel before the pulp passes to the rotary pulp press 76 to which reference will be made later.

Note that the effect of the preceding operation may be summarized as follows:

Starch is separated from by-product potato pulp by means of two countercurrent screening systems. The first system (screens 14 and 15) follows the continuous solid bowl centrifugal separator 13 and the second system (screens 17, 18, 19 and 20) follows the second attrition mill 16. A high percentage of starch is removed from the potatoes in the first screening system.

Removal of the greater proportion of the starch at this stage in the process inhibits modification of the starch which would be brought about by agitation in the second grinder and in the second screening system. Such modification is also inhibited by the reduction in time of exposure of the starch milk to the action of bacteria, yeast, fungii, enzymes, and molds.

The pulp from the first screening system is reground and passes through the second screening system to remove additional starch in order to obtain the greatest possible total removal. Pulp passes out of the process from the last screen 20 of the second countercurrent system. The weak starch milk from the second countercurrent screening system enters the first countercurrent system by serving as make up water in the grinder and for the ground potatoes in the continuous solid bowl centrifugal separator. This procedure reduces the amount of water used and increases the percentage of starch in the starch milk leaving the screens. Other screening arrangements are also possible.

The clogging of the screens is reduced to a minimum by reason of the extraction of much of the gummy and soluble content of the potatoes in centrifugal 13, and by the use of a screening system made alkaline with lime water. Chemicals other than lime water may be used as previously indicated.

The mesh of the screen cloth 38 is the finest so far encountered in the process so that the fibres and solids that are recovered on screen 38 are returned through tank and pump to pipe lines 66 and 65 and thence to rotary pulp press 76. Fresh water may be added in an emergency on screen 38 from line 32.

The starch milk from screen 38 is delivered to tank and pump P15 and thence to centrifugal thickener 39. This thickener is a special type of centrifugal as for example the Merco centrifugal separator. Here the starch milk is thickened and partially purified by removing some water, solubles, and fibre which are sent to waste disposal through line 26. In this machine the starch milk is subjected to centrifugal forces so that a large proportion of the water in the starch milk is separated. The thickened starch milk issues from the thickener in a stream that is known as the underflow. The water taken out is sent to waste disposal by line 26. Fresh water may be added to the underflow from the branch of the fresh water line 32. The treatment in the thickener 39 does not, of course, produce a dry product, but rather one in which the density of the liquid can be brought to a desired point such as 20 degrees Bé.

The starch milk in the underflow is then passed by tank and pump P16, after dilution with fresh water, to a similar centrifugal machine 40 where additional fresh water may be introduced for washing purposes into the machine from branch of pipe line 32. The starch is concentrated in this machine and fine fibre and waste water is drawn off and sent to waste disposal by pipe line 26.

The preceding process is repeated in centrifugal 41, of the same type as centrifugal 40 to which the starch milk is delivered by tank and pump P17. The overflow from which most of the starch has been extracted may be passed by line 42' from centrifugal 41 to screen 42 where some separation of any small amounts of pulp present is effected. This pulp is delivered by tank and pump through pipe 65 to rotary pulp press 76. The dilute starch milk from screen 42 is passed through tank and pump P18 and pipeline 43 back to pump P4 previously mentioned for use as make up on screen 15.

The underflow of thickened and refined starch from centrifugal 41 passes with additions of fresh water from line 32, if desired, through a tank and pump to final screen 64 where any pulp is separated from the starch milk. The fine pulp that may be recovered on the screen is sent through pipeline 65 to the rotary pulp press 76. The starch milk from screen 64 goes to the bleach tank 68 where it may be subjected to any suitable bleaching action, such as the use of sodium hypochlorite followed by neutralization with sulphur dioxide to a suitable pH value, to produce a white starch. Connection from line 32 for the addition of fresh water, in any emergency, is provided for the bleach tank, as shown.

The bleached starch is then washed by means of warm water supplied through heater 70 on a rotary vacuum filter 69 for the purpose of removing so far as possible any solubles still remaining in the starch. The use of this vacuum filter is not essential to the process and is a refinement introduced to make possible the highest quality of starch. The wash water from the vacuum filter goes to waste disposal through pipeline 26.

The washed starch from the vacuum filter then passes to a centrifugal pre-drying machine 71 of the continuous, constant speed, automatic batch loading and discharging type with perforate screen and cloth. A suitable centrifugal machine for this purpose is the ter-Meer centrifugal made by Baker-Perkins, Inc. In this machine a considerable portion of the moisture in the starch is removed. If desired the starch may be further washed during the process of dewatering by the use of warm water delivered through pipeline 73 to the centrifugal pre-dryer 71. The water removed from the starch may be fed back from the centrifugal 71 through the pipeline 72 to the inlet to vacuum filter 69.

Note that the centrifugal outlined above can be replaced by the ordinary suspended basket type of vertical centrifugal with screen and filter cloth. Note also that instead of using centrifugals for pre-drying, the starch from the vacuum filter could be discharged to a continuous conveyor tunnel-type dryer.

From the centrifugal pre-dryer 71, the starch passes to rotary dryer 74, a commercial example of which is the Hersey rotary dryer. From the rotary dryer the finished starch at the proper moisture content passes to the pulverizers and separators with screens where a product of uniform fineness is produced. The Raymond pulverizer and separator is a commercial unit of the type ordinarily used but its use is not essential to the operation of this process.

The starch from the pulverizer and separator passes to the scales and packaging machines 75.

Various residual solids mainly potato pulp pass by pipeline 65 and tank and pump after screen 20 to the rotary pulp press 76, where a large portion of the moisture content is removed, and delivered by pipeline 26 to waste disposal. From the rotary press, the pulp goes to dryer 77 of any suitable form such as a rotary steam tube dryer. From the dryer the pulp at proper moisture content passes to the bagging scales 78 where it is bagged to form cattle feed, etc.

For the sake of simplicity valves in the various piping connections have been omitted but, of course, in any actual installation suitable valves will be included in the various lines as required in order to permit the operation of the system in accordance with this disclosure. It is likewise noted here that in many cases the emergency branch connections from the main lime water and clear water lines have not been numbered since this is deemed unnecessary in the light of the disclosure as written.

The addition of fresh water and lime water to the screens through lines 35, 44, 50, 51, 57, and 60 is not generally contemplated (also other lines not numbered). Additions at these points are emergency additions required when the normal process flow of starch milk is upset as, for example, by clogging of one or more screens.

Among the virtues of the above process are the features of continuity of operation, the speed of processing, the high percentage of removal of the starch from the potatoes, the purification of the starch grains by almost complete separation from fibre and other solid contents of the potatoes, as well as the soluble contents thereof, and the production of a product of excellent color and quality. A further virtue of the process is found in the complete elimination of starch tables and settling tanks heretofore commonly used in all starch extraction processes regardless of the source of the starch. In place thereof and at other points in the process there are used centrifugal machines of types and in a manner and for purposes for which it is believed they have not heretofore been used, particularly in the recovery of starch from sweet potatoes.

The unique feature of the process is that starch is produced with but little change from the state in which it occurred in the sweet potato due to the rapidity of the starch extraction and recovery as covered by this invention.

The process outlined permits repeated washing of the starch in centrifugals and vacuum filter in order to reduce the soluble content of the starch to a minimum.

An important advantage of this process is the reduction in the processing time and therefore the minimization of contamination of the starch by exposure to dirt and bacteria in the atmosphere as would be necessary in processes employing settling tanks or starch tables.

The process of this invention being capable of substantially complete mechanization greatly reduces labor charges. Mechanization of a starch factory with increased consumption of electricity is advantageous in these days of low cost power from passing process steam for drying the starch through bleeding and back pressure turbines.

Another important advantage of the process is present in the manner of handling potato slurry which permits the use of vibrating screens without clogging to an extent to render the process impractical. A high percentage of solubles is removed immediately after the disintegration of the potatoes, a procedure that leads to a decrease in clogging of screens and other equipment.

A two-stage countercurrent screening system is used to insure the rapid removal of starch from the by-product pulp with a minimum quantity of water thereby decreasing the amount of water to be removed by the centrifugals. It also permits the removal of the major part of the starch before it has a chance to become modified.

The screen frame with its screen cloth is removable from the screen unit in order that the screen cloth may be changed rapidly and cleaned quickly and cheaply.

A study of this disclosure by those skilled in the art will naturally result in suggested changes and variations in some respects both in the arrangement of the apparatus and the methods of operating them, and it is desired, therefore, that this disclosure be accepted in an illustrative sense rather than as defining the limits of the invention, the scope of which is defined in the appended claims.

What is claimed is:

1. A process for the extraction of starch from roots containing it, comprising the steps of reducing starch containing roots to a slurry while adding limewater, mixing starch milk with the slurry, immediately subjecting the slurry to centrifugal action to separate the liquids and soluble contents from the insoluble solids consisting mainly of fiber and starch, and screening the solids in successive stages in admixture with starch milk to separate starch from the fiber.

2. A process for the extraction of starch comprising the steps of reducing starch containing roots to a slurry, mixing starch milk with the slurry, immediately subjecting the slurry to centrifugal action while washing it to separate the solids consisting mainly of fiber and starch from the liquid including the solubles and screening the solids in successive stages in admixture with starch milk recovered in the screening stage succeeding the stage in which it is used to separate starch from the fiber.

3. A process for the extraction of starch from roots comprising the steps of reducing starch containing roots to a slurry, mixing starch milk with the roots during such reduction, centrifuging the slurry to separate the liquids and soluble contents from the insoluble solids consisting mainly of fiber and starch, screening the solids in successive stages in admixture with starch milk recovered in the process to separate starch from the fiber, diluting the recovered fiber, subjecting it to a second reduction to disintegrate it further and release additional starch, adding starch milk to this disintegrated fiber, and screening the fiber in successive stages in admixture with starch milk to separate the starch from said fiber.

4. A process for the extraction of starch from roots comprising the steps of reducing starch containing roots to a slurry, mixing starch milk with the roots during such reduction, subjecting the slurry to centrifugal action to separate the liquids from the solids consisting mainly of fiber and starch, screening the solids in successive stages in admixture with starch milk to separate starch from the fiber, diluting the recovered fiber, subjecting it to a second reduction to disintegrate it further and release additional starch, adding starch milk to the disintegrated fiber, subjecting the mixture of fiber and starch milk to successive screening operations while adding at each screening stage starch milk recovered from the succeeding screening stage whereby the starch milk is gradually concentrated and travels back to the first screening stage, withdrawing the concentrated starch milk and centrifuging it and separating the fine fiber from the centrifuged starch milk.

5. A process for the extraction of starch from roots comprising the steps of reducing starch containing roots to a slurry, mixing starch milk with the roots during such reduction, subjecting the slurry to centrifugal action to separate the liquids and soluble contents from the insoluble solids consisting mainly of fiber and starch, screening the solids in several successive stages in admixture with starch milk to separate the starch from the fiber, diluting the recovered fiber, subjecting it to a second reduction to further disintegrate it and release additional starch, adding starch milk to the disintegrated fiber, subjecting the mixture of fiber and starch milk to several successive screening operations while adding at each screening stage starch milk recovered from a succeeding screening stage whereby the starch milk travels back to the first screening stage, removing the starch milk at the first screening stage, thickening it by centrifuging it, and screening out the fine fiber therefrom.

6. A process for the extraction of starch from roots comprising the steps of reducing starch containing roots to a slurry, mixing starch milk with the roots during such reduction, subjecting the slurry to centrifugal action to separate the liquids from the solids consisting mainly of fiber and starch, screening the solids in successive stages in admixture with starch milk to separate starch from the fiber, diluting recovered fiber, subjecting it to a second reduction to further disintegrate it and release additional starch, adding starch milk recovered from the process to the disintegrated fiber, subjecting the mixture of fiber and starch milk to several successive screening operations while adding at each screening starch milk from a succeeding screening, whereby the starch milk is gradually concentrated and travels back to a point of removal at the first screening stage, removing and thickening the concentrated starch milk by centrifuging it, and separating the fine fiber from the thickened starch milk by centrifuging it.

7. A process for the extraction of starch from roots comprising the steps of reducing starch containing roots to slurry, mixing starch milk with the roots during such reduction, centrifuging the slurry to separate the liquids and soluble contents from the insoluble solids consisting mainly of fiber and starch, screening the solids in several successive stages in admixture with starch milk recovered to separate starch from the fiber, diluting the recovered fiber, subjecting it to a second reduction to disintegrate it further and release additional starch, adding starch milk to the disintegrated fiber, subjecting the mixture of fiber and starch milk to several successive screening operations while adding at each screening operation starch milk recovered from the succeeding screening operation whereby the starch milk is gradually concentrated and travels back to the first screening operation, removing the concentrated starch milk, thickening it by centrifuging it, separating the fine fiber from the thickened starch milk by centrifuging it with simultaneous washing of the starch.

8. A process for producing commercial starch comprising the steps of reducing starch containing roots to a slurry, mixing starch milk with the roots during such reduction, centrifuging the slurry to separate the liquids and soluble contents from the insoluble solids consisting mainly of fiber and starch, screening the solids in successive stages in admixture with starch milk to separate starch from the fiber, diluting the recovered fiber, subjecting it to a second reduction to disintegrate it further and release additional starch, adding starch milk to the disintegrated fiber, subjecting the mixture of fiber and starch milk to screening operations in successive stages while adding at each screening stage starch milk recovered from the succeeding screening stage whereby the starch milk is gradually concentrated and returns to the first screening stage, withdrawing the concentrated starch milk from the first screening stage, thickening the concentrated starch milk thus recovered by centrifuging it.

9. A process for producing commercial starch comprising the steps of reducing starch containing roots to a slurry, mixing starch milk with the roots during such reduction, centrifuging the slurry to separate the liquids and soluble contents from the insoluble solids consisting mainly of fiber and starch, screening the solids in successive stages in admixture with starch milk to separate starch from the fiber, diluting the recovered fiber, subjecting it to a second reduction to disintegrate it further and release additional starch, adding starch milk to the disintegrated fiber, subjecting the mixture of fiber and starch milk to screening operations in successive stages while adding at each screening stage starch milk recovered from the succeeding screening stage whereby the starch milk is gradually concentrated and returns to the first screening stage, withdrawing the concentrated starch milk from the first screening stage, thickening the concentrated starch milk thus recovered by centrifuging it, screening the overflow from the centrifuging operation, delivering the screened fluid to one of the previously mentioned screening stages, and screening the thickened starch milk to remove the fine fiber therefrom.

GREGORY M. DEXTER.
FRANCIS H. THURBER.

REFERENCES CITED

The following references are of record in the file of this patent:

UNITED STATES PATENTS

| Number | Name | Date |
|---|---|---|
| 496,689 | Dubiel | Mar. 21, 1893 |
| 744,479 | Goldschmidt | Mar. 22, 1904 |
| 1,006,312 | Steffen | Oct. 17, 1911 |
| 1,156,801 | Moore | Oct. 12, 1915 |
| 1,681,118 | Jaschke | Aug. 14, 1928 |
| 1,828,334 | McCoy | Oct. 20, 1931 |
| 2,013,668 | Peltzer | Sept. 10, 1935 |
| 2,084,250 | Fritze | June 15, 1937 |
| 2,149,802 | Thurber | Mar. 7, 1939 |
| 2,205,657 | King | Jan. 25, 1940 |
| 2,316,807 | Peltzer | Apr. 20, 1943 |
| 2,323,077 | Peltzer | June 29, 1943 |

OTHER REFERENCES

Brautlecht, "Mfg. of White Potato Starch in the U. S.," Ind. & Eng. Chem., vol. 32, No. 7, July 1940, pages 893-898.